United States Patent Office 3,262,215
Patented July 26, 1966

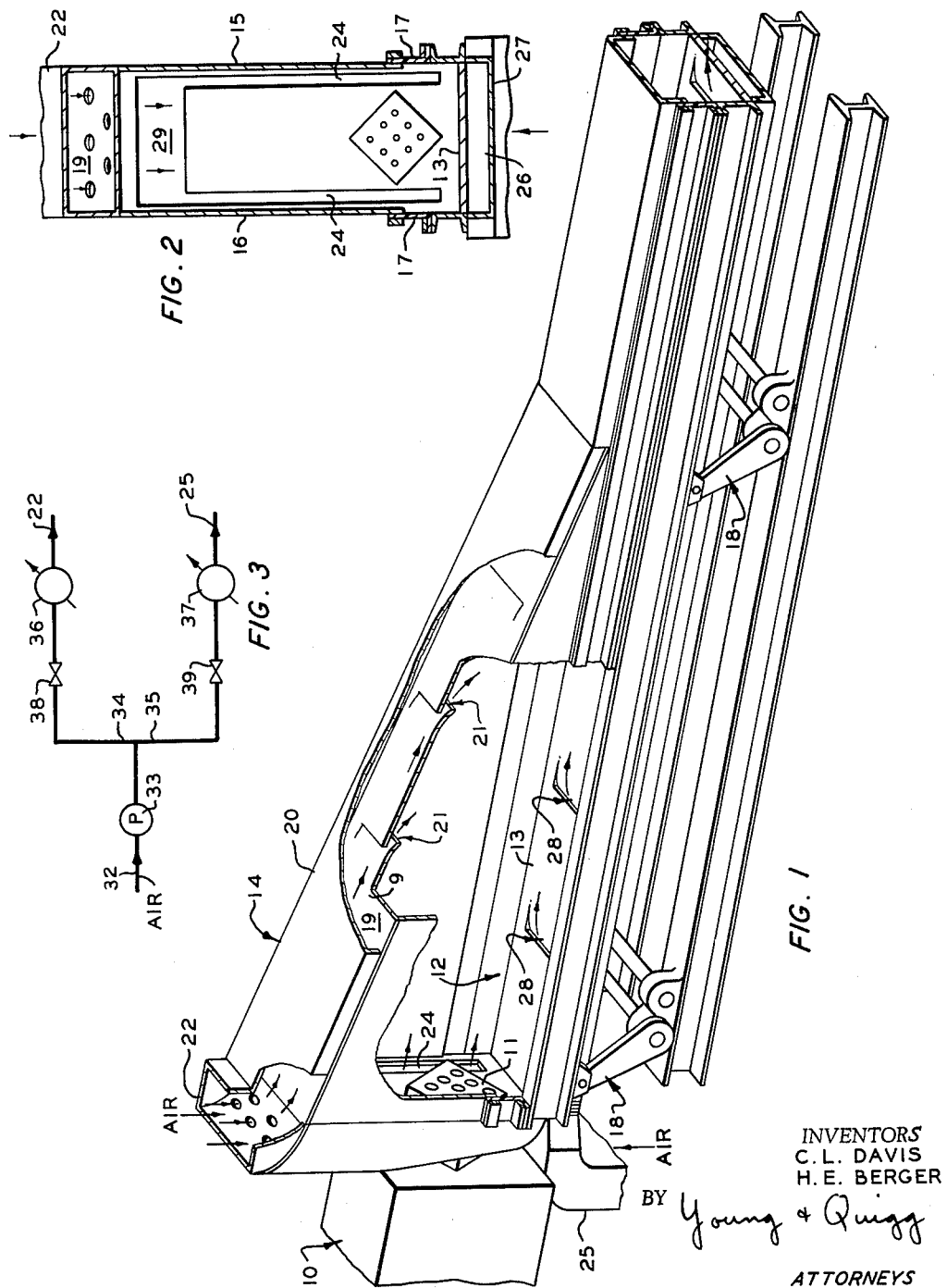

3,262,215
DRYING AND CONVEYING OF SOLIDS
Charles L. Davis and Hugh E. Berger, Borger, Tex., assignors to Phillips Petroleum Company, a corporation of Delaware
Filed May 6, 1963, Ser. No. 278,291
9 Claims. (Cl. 34—17)

This invention relates to the drying and conveying of solid materials.

It is known that water can effectively be removed from many solid materials, particularly rubber and plastics, by mechanical working of the material. One such method involves masticating the material in extrusion equipment employing rotating screws with flights of varying and opposite pitch so that relatively high pressures and temperatures are developed within the material by internal friction. In such equipment, water is squeezed from the material being processed and removed from the interior of the extruder. Thereafter, the pressure is suddenly reduced by passing the material through a die so that the heat produced by the working of the material vaporizes the remaining moisture and other volatile materials. For many materials, procedures of this type can be operated at lower cost than thermal drying methods.

The material expelled through the die is then cooled and transported by a suitable conveyor to storage, packaging or other processing operations. The sudden expansion of the material through the die actually tends to explode the material into a porous mass. Unfortunately, the resulting particles often tend to adhere to the conveying equipment and to the housing which surrounds the die and directs the material to the conveyor. In addition, some moisture may remain in the expanded material which can cause problems in subsequent fabricating operations.

In accordance with the present invention, a method is provided which prevents the particles from sticking to the housing and conveying equipment employed in such a drying operation. This is accomplished by passing a gaseous stream between the die and the housing walls in the direction of movement of the particles. This gaseous envelope serves to prevent the particles from sticking to the housing walls. In addition, the moisture content of the particles is reduced even further by the gaseous stream. In accordance with another aspect of this invention, an additional gaseous stream can be directed along the surface of the conveyor to assist in transporting the material and prevent sticking of the material to the conveyor.

Accordingly, it is an object of this invention to provide an improved method of removing liquids from solid materials.

Another object is to provide apparatus for drying solids and conveying the dried solids from the drying equipment.

A further object is to provide a method for drying and conveying rubber particles in such a manner as to avoid sticking of the particles to the conveying equipment.

Other objects, advantages and features of the invention should become apparent from the following detailed description, taken in conjunction with the accompanying drawing in which:

FIGURE 1 is a perspective view, shown partially in section, of an embodiment of the drying equipment of this invention.

FIGURE 2 is an end view, shown partially in section, illustrating details of the construction of the apparatus of FIGURE 1.

FIGURE 3 is a schematic view of a control system to regulate the temperature and flow of air.

The apparatus of this invention is particularly useful in drying synthetic rubber, and will be described in conjunction with such a process. The rubber to be dried is introduced into an extrusion dryer 10 which can be of the type described in U.S. Patent No. 3,078,836. The rubber is subjected to mechanical working in the dryer and is expelled through a die plate 11 under relatively high pressure. The moisture content of the rubber expelled through the die plate is generally less than about ten percent by weight. As disclosed in the above-mentioned patent, a chopping plate can be positioned adjacent the die plate. In any event, the sudden release of pressure at the die plate results in a rapid expansion of the extruded rubber and flashing of the remaining material. The rubber particles literally explode outwardly from the die plate.

A conveyor 12 is positioned beneath the die plate to transport the rubber particles to storage, packaging or fabricating equipment. This conveyor can be a vibrating machine in which an elongated pan 13 is subjected to an oscillatory motion to move the particles away from the die plate. Equipment of this type is, of course, well known in the art. A suitable motor, not shown, imparts vibratory movement to pan 13 through rods 18. Conveyor 12 is surrounded by a housing 14 of generally rectangular cross section. This housing comprises side walls 15 and 16 which extend upwardly from the edge of pan 13. As illustrated in FIGURE 2, flexible connecting members 17 join the side walls to pan 13. The top of housing 14 is closed by a roof plate 9 which slopes downwardly away from the die plate. It should thus be evident that the particles expelled through the die plate are collected on pan 13 and conveyed away from the extrusion dryer.

Prior to this invention it was found that rubber particles quite often adhered to the walls of the housing where they would aglomerate until the resulting mass was of sufficient weight to fall to the conveyor. These particles were often observed to have white spots which indicated the presence of moisture.

In accordance with this invention, a curtain of air or other drying gas is passed through the housing so as to surround the particles expelled through die plate 11. To this end, a chamber 19 is formed above the roof of the housing by a cover plate 20. The roof 9 of the housing is provided with a plurality of openings 21 which extend into the housing in directions away from die plate 11. Air or other drying gas is introduced into chamber 19 through a conduit 22 so that the air enters the housing through openings 21 and flows along the underside of roof 20. The passage of air in this manner prevents the particles from sticking to the roof of the housing and facilitates further drying of the particles.

Conduit 22 also extends downwardly along the sides of the housing and is provided with elongated openings 24 adjacent the side walls 15 and 16. Additional air enters the housing through side openings 24 and a top opening 29 so as to sweep along the side walls and roof. This additional air flow further prevents the particles from adhering to the housing walls and roof. Still more air is introduced into the conveying apparatus through a conduit 25. Conduit 25 communicates with a chamber 26 which is formed beneath conveyor pan 13 by means of a plate 27. Conveyor pan 13 is provided with a series of openings 28 which correspond to openings 21 in roof 19. Air thus passes along the top of the conveyor pan in the direction of the movement of the particles. This air flow tends to prevent the particles from adhering to the conveyor pan and assists in transporting the particles along the conveyor.

It is generally desirable to control the temperature of the housing walls and the conveyor to assist the drying operation and prevent particles from adhering to the surfaces. This temperature control can conveniently be accomplished by regulating the temperature of the air or other drying gas supplied to the conveyor and housing, as shown in FIGURE 3. Air is introduced through a conduit 32 which has a blower 33 therein. Branch conduits 34 and 35 extend between conduit 32 and respective heat exchangers 36 and 37. Control valves 38 and 39 are disposed in respective conduits 34 and 35. The heated air from exchangers 36 and 37 is supplied to respective inlets 22 and 25 of FIGURE 1. Alternatively, heaters can be attached to the housing walls and the conveyor to maintain the desired temperature. In the drying of polymers formed predominantly by cis 1,4-addition, it has been found that the temperature of the air introduced into the system should be in the general range of 100 to 200° F. The introduction of air into conduit 22 at 180° F. and the introduction of air into conduit 25 at 110° F. has been found to be quite effective, for example, in the drying and transporting of this particular rubber. The optimum temperature to be employed for any other material can readily be determined by routine testing using air at different temperatures. In the drying of the butadiene polymer mentioned above, effective results were obtained when air at 180° F. was introduced into conduit 22 at a rate of approximately 3,000 cubic feet per minute. Air at 110° F. was introduced into conduit 25 at the rate of 1300 cubic feet per minute. In this operation, conveyor plate 13 was approximately two feet in width. The height of housing 14 adjacent the die plate was approximately four feet. The rubber was extruded through die 11 at a rate of approximately 6,500 pounds per hour and contained about 6 percent by weight moisture.

The drying and conveying equipment of this invention cam be employed in conjunction with the drying of various types of materials. It is particularly useful in drying synthetic rubber and other polymers. In general, the equipment can be employed in conjunction with the drying of any material which can advantageously be dried in a mechanical extruder dryer.

While the invention has been described in conjunction with a presently preferred embodiment, it obviously is not limited thereto.

What is claimed is:

1. A method of drying and conveying rubber particles whereby a slurry of rubber crumb and water has substantially all of the water removed therefrom to produce a non-agglomeated mass of rubbery particles, said method comprising:
   A. passing said slurry to an extrusion drier;
   B. working said rubber in said drier under pressure so that a substantial amount of water is removed from said rubber;
   C. separating the thus squeezed water from rubber;
   D. extruding said rubber through a die plate into a zone of lower pressure, thus causing the rubber to expand suddenly, breaking into particles and thereby releasing added moisture to vaporization;
   E. enveloping said particles with a heated gas as they are extruded through the die plate to maintain said added moisture in vapor condition and to prevent condensation of water vapor on the particles, and to prevent agglomeration of said particles;
   F. collecting said particles on a conveyor and transporting said particles away from said extrusion dryer; and
   G. maintaining said heated gas in contact with said particles as they are being conveyed away from said die to cause further drying of said particles and to prevent condensation of water vapor on said particles.

2. The method of claim 1 wherein the material being dried is a polymer of butadiene formed predominantly by cis 1,4-addition, and wherein the gas is air at a temperature in the range of 100 to 200° F.

3. A system for drying and conveying polymer particles to produce a non-agglomerated dried mass of particles, comprising:
   A. an extrusion dryer comprising a means for mechanically working a slurry of said polymer and water to squeeze from said polymer substantial amounts of water, a die plate, and a means to express said polymer through said die plate whereby said polymer expands rapidly as it is extruded;
   B. a conveyor means beneath said die plate to remove the polymer particles formed by the rapid expansion of said polymer;
   C. a housing enclosing said die and said conveyor, said housing maintained at such a pressure that there is a pressure drop between said extrusion dryer and said housing; and
   D. means in said housing to direct a stream of heated gas to immediately surround said polymer particles as they are extruded from said die plate to prevent condensation of moisture which has evaporated due to the decrease in pressure on said polymer, thereby preventing agglomeration of said particles.

4. A system according to claim 3 wherein said housing also has a means to direct a stream of heated gas into cocurrent contacts with said polymer particles on said conveyor.

5. A system according to claim 3 wherein said conveyor means extends substantially horizontally, said housing envelopes said conveyor means, tapering from said extrusion dryer along said conveyor, said housing having side walls extending upwardly from the edges of said conveyor and a roof which tapers downwardly over said conveyor away from said die, said roof having a plurality of openings therein; a means to pass a heated gas stream into said housing through said openings in said roof in a direction cocurrent to the movement of said conveyor means; and a means to pass a heated gas stream through said housing along said side walls in a direction away from said die to maintain the side walls in a dry condition thereby preventing said particles from agglomerating on said side walls.

6. The system of claim 3 wherein said conveyor comprises an oscillatory pan which receives particles from the die and conveys same, said pan being provided with a plurality of openings which extend from the lower side of the pan to the interior in a direction away from the die so that gas can be introduced therethrough to move along the surface of the conveyor.

7. The system of claim 3, further comprising means to control the temperature of the walls of said housing to reduce further the tendency of the particles to adhere to such walls.

8. The system of claim 7 wherein said means to control the temperature of the walls comprises means to regulate the temperature of the gas passed into the housing.

9. The system of claim 3 wherein said conveyor comprises a moving surface conveyor, the surface of which holds the particles, and further comprising means to pass a stream of gas along the surface of said conveyor in the direction of movement of the particles.

References Cited by the Examiner

UNITED STATES PATENTS

| | | | |
|---|---|---|---|
| 1,797,335 | 3/1931 | Fedeler. | |
| 2,771,689 | 11/1956 | Bettes | 34—17 |
| 2,812,591 | 11/1957 | Kling | 34—70 |
| 3,067,462 | 12/1962 | Kullgren | 34—14 |
| 3,091,443 | 5/1963 | Herz et al. | 263—32 |
| 3,112,186 | 11/1963 | Davis et al. | 34—164 X |
| 3,173,768 | 3/1965 | Witte | 34—164 |

JOHN J. CAMBY, *Acting Primary Examiner.*

WILLIAM F. O'DEA, *Examiner.*

D. A. TAMBURRO, *Assistant Examiner.*